(12) United States Patent
Huang et al.

(10) Patent No.: US 10,887,178 B2
(45) Date of Patent: Jan. 5, 2021

(54) MANAGEMENT OF ANALYTICS TASKS IN A PROGRAMMABLE NETWORK

(71) Applicant: Telefonaktiebolaget LM Ericsson (publ), Stockholm (SE)

(72) Inventors: Vincent Huang, Stockholm (SE); Daniele Ceccarelli, Stockholm (SE); Qing Wan, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 128 days.

(21) Appl. No.: 16/083,543

(22) PCT Filed: Mar. 17, 2016

(86) PCT No.: PCT/EP2016/055801
§ 371 (c)(1),
(2) Date: Sep. 10, 2018

(87) PCT Pub. No.: WO2017/157447
PCT Pub. Date: Sep. 21, 2017

(65) Prior Publication Data
US 2019/0081863 A1   Mar. 14, 2019

(51) Int. Cl.
*G06F 15/173* (2006.01)
*H04L 12/24* (2006.01)
*H04L 12/26* (2006.01)
*H04L 12/715* (2013.01)

(52) U.S. Cl.
CPC .......... *H04L 41/12* (2013.01); *H04L 41/042* (2013.01); *H04L 41/046* (2013.01); *H04L 41/0806* (2013.01); *H04L 43/12* (2013.01); *H04L 45/64* (2013.01)

(58) Field of Classification Search
USPC .......... 705/14.42, 14.48; 709/201, 203, 206, 709/217, 219, 223, 224, 226, 228, 230, 709/232, 238
See application file for complete search history.

(56) References Cited

U.S. PATENT DOCUMENTS

| | | | |
|---|---|---|---|
| 7,596,523 B2 * | 9/2009 | Sobel | G06Q 40/06 709/201 |
| 8,447,851 B1 * | 5/2013 | Anderson | G06F 11/3082 709/223 |
| 9,648,542 B2 * | 5/2017 | Hsu | H04L 43/12 |

(Continued)

FOREIGN PATENT DOCUMENTS

EP    2908470 A1    8/2015

*Primary Examiner* — Quang N Nguyen
(74) *Attorney, Agent, or Firm* — Coats & Bennett, PLLC

(57) ABSTRACT

Distributed management of analytics tasks in a programmable network (100) having a controller (SDNC, 10, 11), a plurality of network nodes (20, N1-N5) coupled to the controller by a Data Communications Network DCN, and a plurality of analytics servers (30) each coupled to a network node, involves the controller selecting which of the analytics servers to use for an analytics task. The selection is based on how data logged by respective ones of the network nodes and needed for that analytics task, can be routed to the analytics servers. The controller sends to the selected analytics server, an indication of the analytics task and an indication of what data logged by the network nodes is to be used in the analytics task.

26 Claims, 15 Drawing Sheets

(56) References Cited

U.S. PATENT DOCUMENTS

| | | | |
|---|---|---|---|
| 2013/0060912 A1* | 3/2013 | Rensin | H04L 67/22 709/219 |
| 2013/0262617 A1* | 10/2013 | Ligman | G06F 11/3476 709/217 |
| 2014/0169187 A1* | 6/2014 | Jenkins | H04L 41/145 370/252 |
| 2014/0280338 A1 | 9/2014 | Metz et al. | |
| 2015/0222693 A1* | 8/2015 | Tully | G06F 11/3438 709/203 |
| 2016/0050132 A1 | 2/2016 | Zhang | |
| 2016/0189201 A1* | 6/2016 | Shao | G06Q 30/0243 705/14.42 |
| 2016/0189207 A1* | 6/2016 | Xu | G06Q 30/0249 705/14.48 |
| 2016/0364745 A1* | 12/2016 | He | G06Q 30/0243 |
| 2017/0109413 A1* | 4/2017 | Gholami | G06Q 30/02 |
| 2017/0163483 A1* | 6/2017 | Shanmugam | H04L 41/0806 |

* cited by examiner

US 10,887,178 B2

MANAGEMENT OF ANALYTICS TASKS IN A PROGRAMMABLE NETWORK

TECHNICAL FIELD

The present invention relates to methods of managing distributed analytics tasks in a programmable network, to computer programs for such methods, to controllers for managing distributed analytics tasks, network nodes for distributing analytics tasks, and analytics servers for receiving analytics tasks and cooperating with the controller.

BACKGROUND

It is known to provide programmable networks for communication of information.

One known type of programmable network is an SDN (Software-defined networking). SDN is an approach to network control that allows network administrators to manage network services through abstraction of lower-level functionality. This is done by decoupling the control plane from the data plane, where the SDN controller as the control plane makes the decision how the device in data plane should behave. SDN is used typically for transport networks, as they migrate from a fully distributed control to a paradigm that is commonly known as SDN 2.0. In SDN 2.0 protocols keep on being distributed but the overall control of the network is logically centralized.

SDN requires some method for the control plane to communicate with the data plane. One such mechanism, OpenFlow, is often misunderstood to be equivalent to SDN, but other mechanisms could also fit into the concept. In SDN there is an SDN Controller, a logically centralized entity, used for translating the requirements from the SDN Application layer down to the SDN Data path, and for providing SDN Applications with an abstract view of the network (which may include statistics and events). An SDN Controller usually consists of one or more NBI Agents, the SDN Control Logic, and the Control to Data-Plane Interface (CDPI) driver. An SDN controller is a strategic control point in the SDN network. By means of both distributed protocols and programmatic interfaces towards the nodes, it is able to get data about the network, logged at the nodes of the network, such as switches and routers. The most common protocols used by the SDN controller to communicate with the switches and routers are OpenFlow, OVSDB, PCEP, netconf, as well as the participation to IGP and BGP instances. It is known to provide for the SDN controller to collect or process such data about the network, logged at the nodes of the network, known generally as analytics, for use by the SDN controller in managing the network, or for use by applications in managing services for users for example. If these analytics tasks become more widely used, they will use up more resources and become more difficult to manage efficiently.

SUMMARY

Embodiments of the invention provide improved methods and apparatus. According to a first aspect of the invention, there is provided a method of distributed management of analytics tasks in a programmable network having a controller (SDNC), a plurality of network nodes coupled to the controller by a Data Communications Network DCN, and a plurality of analytics servers each coupled to at least one of the network nodes. The controller is arranged to select, for each of the analytics tasks to be distributed, which of the analytics servers to use for that analytics task based on how data logged by respective ones of the network nodes and needed for that analytics task, can be routed to the analytics servers. Then it sends to the selected analytics server, an indication of the analytics task and an indication of what data logged by the network nodes is to be used in the analytics task, to enable the selected analytics server to carry out the analytics task.

Any additional features can be added, and some are described below and set out in dependent claims. Another aspect of the invention provides a method of distributed management of analytics tasks by a network node in a programmable network having a controller (SDNC), a plurality of such network nodes coupled to the controller by a Data Communications Network DCN, and a plurality of analytics servers each coupled to at least one of the network nodes. The network node receives from the controller, for each of the analytics tasks to be distributed, an indication of the analytics task and an indication of what data logged by the network nodes is to be used in the analytics task, and selects which of the analytics servers to use for that analytics task based on how the logged data needed for that analytics task can be routed to the analytics servers. The network node sends to the selected analytics server, the indication of the analytics task, and the indication of what data logged by the network nodes is to be used, to enable the selected analytics server to carry out the analytics task.

Another aspect provides a method by an analytics server, of distributed management of analytics tasks in a programmable network, the programmable network having a controller (SDNC), a plurality of network nodes coupled to the controller by a Data Communications Network DCN, and a plurality of such analytics servers each coupled to at least one of the network nodes. The one of the analytics servers carries out steps of cooperating with the controller to enable the controller to select which analytics server to use for one of the analytics tasks on the basis of how data logged by the network nodes and needed for that analytics task can be routed to the analytics servers, and receiving an indication of the analytics task and an indication of what data logged by the network nodes is to be used in the analytics task. The analytics server also receives the indicated logged data, carries out the analytics task on that received logged data, and sends to another part of the programmable network over the DCN, results of carrying out the analytics task.

Another aspect of the invention provides a controller for distributing analytics tasks in a programmable network having a plurality of network nodes coupled to the controller by a Data Communications Network DCN, and a plurality of analytics servers each coupled to at least one of the network nodes, the controller having a processing circuit and a memory circuit, the memory circuit having instructions executable by the processor circuit. Said processing circuit when executing the instructions is configured to, for each of the analytics tasks to be distributed, select which of the analytics servers to use for that analytics task based on how data logged by respective ones of the network nodes and needed for that analytics task, can be routed to the analytics servers, and send to the selected analytics server, an indication of the analytics task and an indication of what data logged by the network nodes is to be used in the analytics task, to enable the selected analytics server to carry out the analytics task.

Another aspect of the invention provides a network node of a programmable network, the programmable network having a controller, a plurality of such network nodes coupled to the controller by a Data Communications Network DCN, and a plurality of analytics servers each coupled to at least one of the network nodes, the network node being configured to distribute analytics tasks and having a processing circuit and a memory circuit, the memory circuit having instructions executable by the processor circuit. Said processing circuit when executing the instructions is configured to, for each of the analytics tasks to be distributed, receive from the controller an indication of the analytics task and an indication of what data logged by the network nodes is to be used in the analytics task, and select which of the analytics servers to use for that analytics task based on how the logged data needed for that analytics task can be routed to the analytics servers. It also sends to the selected analytics server the indication of the analytics task, and the indication of what data logged by the network nodes is to be used, to enable the selected analytics server to carry out the analytics task.

Another aspect of the invention provides an analytics server for receiving analytics tasks distributed across a programmable network, the programmable network having a controller, a plurality of network nodes coupled to the controller by a Data Communications Network DCN, and a plurality of such analytics servers each coupled to at least one of the network nodes, the analytics server having a processing circuit and a memory circuit, the memory circuit having instructions executable by the processor circuit. Said processing circuit when executing the instructions is configured to cooperate with the controller to enable the controller to select which analytics server to use for one of the analytics tasks on the basis of how data logged by the network nodes and needed for that analytics task can be routed to the analytics servers and to receive an indication of the analytics task and an indication of what data logged by the network nodes is to be used in the analytics task. It is also configured to receive the indicated logged data, carry out the analytics task on that received logged data, and send to another part of the programmable network over the DCN, results of carrying out the analytics task.

Another aspect provides a controller for distributing analytics tasks in a programmable network having a plurality of network nodes coupled to the controller by a Data Communications Network DCN, and a plurality of analytics servers each coupled to at least one of the network nodes. The controller has a selector for selecting, for each of the analytics tasks to be distributed, which of the analytics servers to use for that analytics task, based on how data logged by respective ones of the network nodes and needed for that analytics task, can be routed to the analytics servers, and a sending unit for sending to the selected analytics server, an indication of the analytics task and an indication of what data logged by the network nodes is to be used in the analytics task, to enable the selected analytics server to carry out the analytics task. Optionally the controller also has a receiver for receiving from the selected analytics server over the DCN, results of carrying out the analytics task.

Another aspect provides a network node of a programmable network, the programmable network having a controller, a plurality of such network nodes coupled to the controller by a Data Communications Network DCN, and a plurality of analytics servers each coupled to at least one of the network nodes, the network node being configured to distribute analytics tasks. The network node has a receiver for receiving from the controller, an indication of the analytics task and an indication of what data logged by the network nodes is to be used in the analytics task, and a selector for selecting which of the analytics servers to use for that analytics task based on how the logged data needed for that analytics task can be routed to the analytics servers. It also has a sending unit for sending to the selected analytics server the indication of the analytics task, and the indication of what data logged by the network nodes is to be used, to enable the selected analytics server to carry out the analytics task.

Another aspect of the invention provides an analytics server for receiving analytics tasks distributed across a programmable network, the programmable network having a controller, a plurality of network nodes coupled to the controller by a Data Communications Network DCN, and a plurality of such analytics servers each coupled to at least one of the network nodes. The analytics server has a unit for cooperating with the controller to enable the controller to select which analytics server to use for one of the analytics tasks on the basis of how data logged by the network nodes and needed for that analytics task can be routed to the analytics servers, and a receiver for receiving an indication of the analytics task and an indication of what data logged by the network nodes is to be used in the analytics task. The analytics server also has a receiver for receiving the indicated logged data, an analytics unit for carrying out the analytics task on that received logged data, and a sending unit for sending to another part of the programmable network over the DCN, results of carrying out the analytics task.

Any additional features may be added to any of the aspects as appropriate. One such additional feature is, the controller receiving from the selected analytics server over the DCN, results of carrying out the analytics task. Another such additional feature is a preliminary step of carrying out an auto discovery of what analytics servers are available. Another is where at least some of the analytics servers are within a routing domain of the controller and the auto discovery comprises receiving indications from these analytics servers that they are available. Another such additional feature is where at least some of the analytics servers are not within a routing domain of the controller and the auto discovery comprises receiving an indication from a network node that it has an associated analytics server available. Another such additional feature is the controller sending to at least one of the network nodes, an indication of what data logged by that network node is to be sent to which of the analytics servers. Another such additional feature is the controller receiving an indication of amounts of spare capacity of the analytics servers. Another such additional feature is the analytics server sending results of the analytics task which include selected unprocessed logged data for further processing at the controller.

Any of the additional features can be combined together and combined with any of the aspects. Other effects and consequences will be apparent to those skilled in the art, especially over compared to other prior art. Numerous variations and modifications can be made without departing from the claims of the present invention.

BRIEF DESCRIPTION OF THE DRAWINGS:

How the present invention may be put into effect will now be described by way of example with reference to the appended drawings, in which.

DETAILED DESCRIPTION

Figure 1:
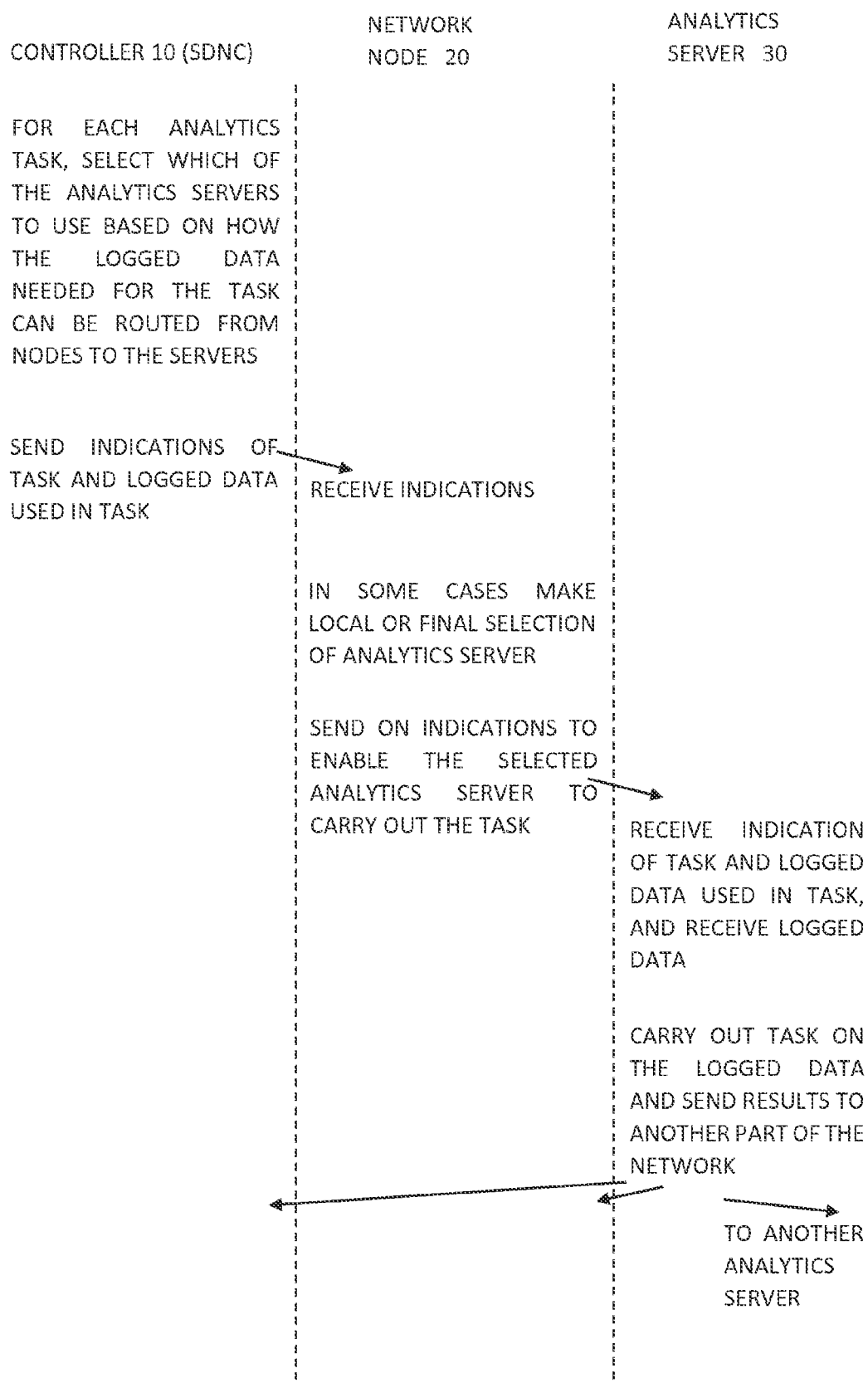
FIGS. 1 to 8 show examples of sequence charts of methods of distributed management of analytics tasks according to embodiments.

The present invention will be described with respect to particular embodiments and with reference to certain drawings but the scope of the invention is not limited thereto. The drawings described are only schematic and are non-limiting. In the drawings, the size of some of the elements may be exaggerated and not drawn to scale for illustrative purposes.

Definitions:

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated.

References to instructions, programs, or software can encompass any type of programs in any language executable directly or indirectly on processing hardware. References to processors, hardware, processing hardware or circuitry can encompass any kind of logic or processor or analog circuitry, integrated to any degree, and not limited to general purpose processors, digital signal processors, ASICs, FPGAs, discrete components or logic and so on.

References to a processor are intended to encompass implementations using multiple processors which may be integrated together, or co-located in the same node or distributed at different locations for example.

ABBREVIATIONS

ASIC Application Specific Integrated Circuit
BGP Border Gateway Protocol
CDPI Control to Data-Plane Interface
DCN Data Communication Network
FPGA Field Programmable Gate Array
IGP Interior Gateway Protocol
MPLS Multiprotocol Label Switching
NBI North-Bound Interface
OVSDB Open vSwitch Database management protocol
PCEP Path Computation Element Protocol
SDN Software Defined Networking
TE Traffic Engineering
TLV Type Length Value Introduction to Issues By way of introduction to the embodiments, some issues with conventional designs will be explained with reference to the example of SDN, though other programmable networks are also contemplated. With the increased popularity of SDN and advanced requirements on analytics, the data amount to be collected will increase exponentially. The SDN controller will be asked to handle large amounts of data and perform advanced analytics. This could degrade the normal operation of the SDN controller both form a computational point of view and from the huge amount of logged data that would go through the DCN (Data Communication Network). This is a particular problem if the DCN is shared with the control protocols, though it is also a problem even if not shared. The collecting of logged data and processing of analytics tasks in the SDN controller will become cumbersome for the SDN controller to handle. This is even more of a problem as the network and DCN are scaled up over time. For an example of a possible problem, the SDN controllers could be requested to collect and process data from the nodes, with consequent computational/processing burden and possible overload of the DCN during time frames when a prompt intervention from the SDN controller could be needed is needed (e.g. failures and re-routing).

Introduction to Embodiments

To address these problems and handle the analytics tasks more efficiently, the proposed methods and apparatus are based on providing analytic servers for data processing and adaptive distributed data processing and routing of data collection in the nodes (switches/routers) and DCN. The controller can receive analytics tasks from applications or generate them itself. Instead of collecting data from all nodes and performing the analytics task at the controller, the controller now distributes the analytics tasks to the analytics servers, either directly or by sending them to nodes to pass on to analytics servers.

In some cases this can use a modification of an existing protocol. In some cases the communication between controller and analytics servers can be manually set up, in other cases there can be a discovery mechanism so that analytics servers can be automatically discovered by the nodes and controller. This can provide information about their capabilities and current load. Based on the results of the analytics task, the analytics server can in some examples adapt its operation by ordering more data through SDN controller for example. The controller can inform the network nodes which data needs to be collected and which analytics tasks need to be performed. The nodes or the controller (or both jointly) can discover the availability and location of the analytics server based on their capability and current traffic loads and/or cost and make a decision to choose the most suitable server to perform the analytics task. The data from the nodes can be sent in batch or streaming format. The interface between the controller and nodes can be adapted to support the distribution of the task. At the same time, the control and programmatic protocols can be adapted to support sending the logged data (such as status data e.g. FCAPS) to a centralized data analytic server.

FIG. 1, Sequence Chart Showing Actions of Embodiments

FIG. 1 shows a sequence chart of actions according to embodiments, with time flowing down the figure. A left column shows some actions of a controller 10 relating to managing distributed analytics tasks according to an embodiment. Other functions of the controller in controlling the network are not shown. A central column shows some actions of one of the network nodes 20 relating to managing distributed analytics tasks according to an embodiment. A right column shows some actions of an analytics server relating to the analytics tasks according to an embodiment. This shows an example of a method of distributed management of analytics tasks in a programmable network having a controller (SDNC), a plurality of network nodes coupled to the controller by a Data Communications Network DCN, and a plurality of analytics servers each coupled to at least one of the network nodes. At the top of the left column there is a step by the controller of, for each of the analytics tasks to be distributed, selecting which of the analytics servers to use for that analytics task based on how data logged by respective ones of the network nodes and needed for that analytics task, can be routed to the analytics servers. This can be for example based on the shortest path, or least busy path or a combination of known routing criteria. Another step for the controller is sending to the selected analytics server, an indication of the analytics task and an indication of what data logged by the network nodes is to be used in the analytics task, to enable the selected analytics server to carry out the analytics task. The results may be sent to any other part of the programmable network. If the results are sent to the controller, then there is a step by the controller of receiving from the selected analytics server over the DCN, the results of carrying out the analytics task. Another option is that results are sent to another analytics server as an input to another analytics task. The results may be used by an application, or by the controller or by a network node for example.

The figure also shows, in the central column, an example of a method by one of the network nodes of, for each of the analytics tasks to be distributed, receiving from the controller an indication of the analytics task and an indication of what data logged by the network nodes is to be used in the analytics task, and selecting which of the analytics servers to use for that analytics task based on how the logged data needed for that analytics task can be routed to the analytics servers. The network node is also shown to send to the selected analytics server the indication of the analytics task, and the indication of what data logged by the network nodes is to be used, to enable the selected analytics server to carry out the analytics task.

The figure also shows, in the right column an example of a method by the analytics server of cooperating with the controller to enable the controller to select which analytics server to use for one of the analytics tasks on the basis of how data logged by the network nodes and needed for that analytics task can be routed to the analytics servers, and receiving an indication of the analytics task and an indication of what data logged by the network nodes is to be used in the analytics task. The analytics server is also shown to receive the indicated logged data, carry out the analytics task on that received logged data, and send to another part of the programmable network over the DCN, results of carrying out the analytics task. This can encompass for example sending to the controller, or sending to a network node, or sending to another analytics server for use as an input to another analytics task. References to sending results can encompass sending direct results of the analytics task, or sending indirect results in the sense of results after further processing of the direct results. Such further processing could take place anywhere in principle, such as at the same analytics server, or at another analytics server for example. Reference to "cooperating with the controller to enable the controller to select which analytics server to use" can encompass any type of cooperation, including for example periodic updates from the server of availability, status, load, and so on, or advertising presence for auto discovery, and so on.

References to an analytics task here and elsewhere in this document are intended as encompassing any type of selective retrieval, and/or storing, with or without processing, of the data logged by the network nodes and corresponding output of raw or processed logged data. References to an analytics server are intended to encompass as any kind of processing hardware suitable for carrying out an analytics task. References to logged data, logged by the network nodes, are intended as encompassing at least data relating to characteristics of traffic carried by the node, such as FCAPS data and so on. References to "selecting which of the analytics servers to use" is intended to encompassing selecting one, or selecting a group of analytics servers, or making a partial selection by selecting a network node which is associated with or coupled, to a subset of multiple analytics servers, and delegating the final selection from that subset of servers to be made by that network node. References to DCN are intended as encompassing any way of communicating between the entities, either with the payload traffic or separately for example. References to a controller are intended to encompass an SDN controller or other types of controller for controlling nodes in other kinds of programmable network.

A notable consequence of such distribution of the analytics tasks, compared to all being carried out in centralised fashion by the controller, is that the processing or communications loads on the SDNC and the DCN can be reduced or spread more evenly, or the analytics tasks can be scaled up with less risk of temporary overloading of the SDNC or the DCN. A notable consequence of selecting which analytics server or servers to use according to how the logged data can be routed, is that the load on the DCN can be managed and spread to avoid bottlenecks. This can also facilitate the scaling up of the analytics tasks. For cases where the DCN is shared with messages relating to network control, then there is an added benefit of reducing an impact of analytics tasks overloads, or scaling up, on such control messages. For a DCN complying to a particular protocol this may imply some expansion or alteration to the protocol to provide for it to communicate the tasks and corresponding results. Note these advantages can apply whether or not the embodiment includes the discovery feature, so embodiments may have or not have this feature. Nor are these advantages dependent on whether or not the results are returned via a node optionally used in the selecting process, so embodiments may have or not have this feature. Furthermore these advantages are not dependent on whether that node is used to feed the indicated data to the selected server, so again, embodiments may have or not have this feature.

A summary of steps in another example of the method is provided below (note some steps are optional and some can be carried out in a different sequence):

1. The analytics servers are optionally discovered by the network nodes and the controller (or controllers in case of multiple domains);

2. Optionally, the capabilities of the analytics servers are advertised;

3. The controller indicates to the nodes which nodes send analytics data to which servers, optionally by sending default values for use if no specific values are sent for each task;

4. The controller is optionally able to modify such default values according to network status or analytics servers load to tell the nodes which server to deliver analytics to;

5. The tasks can use centralized or distributed processing options as follows:
   a. The controller can collect the processed analytics results from the different servers when most suitable for network utilization and congestion.
   b. The controller can collect the results in the form of raw data from the Analytics Server and then do the processing (the analytics task is just collecting and storing at the Analytics server in this case, without processing)
   c. The results can be sent elsewhere, to another analytics server or a network node for example.

6. The controller can make use of the analytics results data if it is the final user (e.g. for predictive traffic offloading) and/or makes the data available to the applications.

7. The analytics servers can periodically update their status and capacity (e.g. storage capacity).

Figure 2:
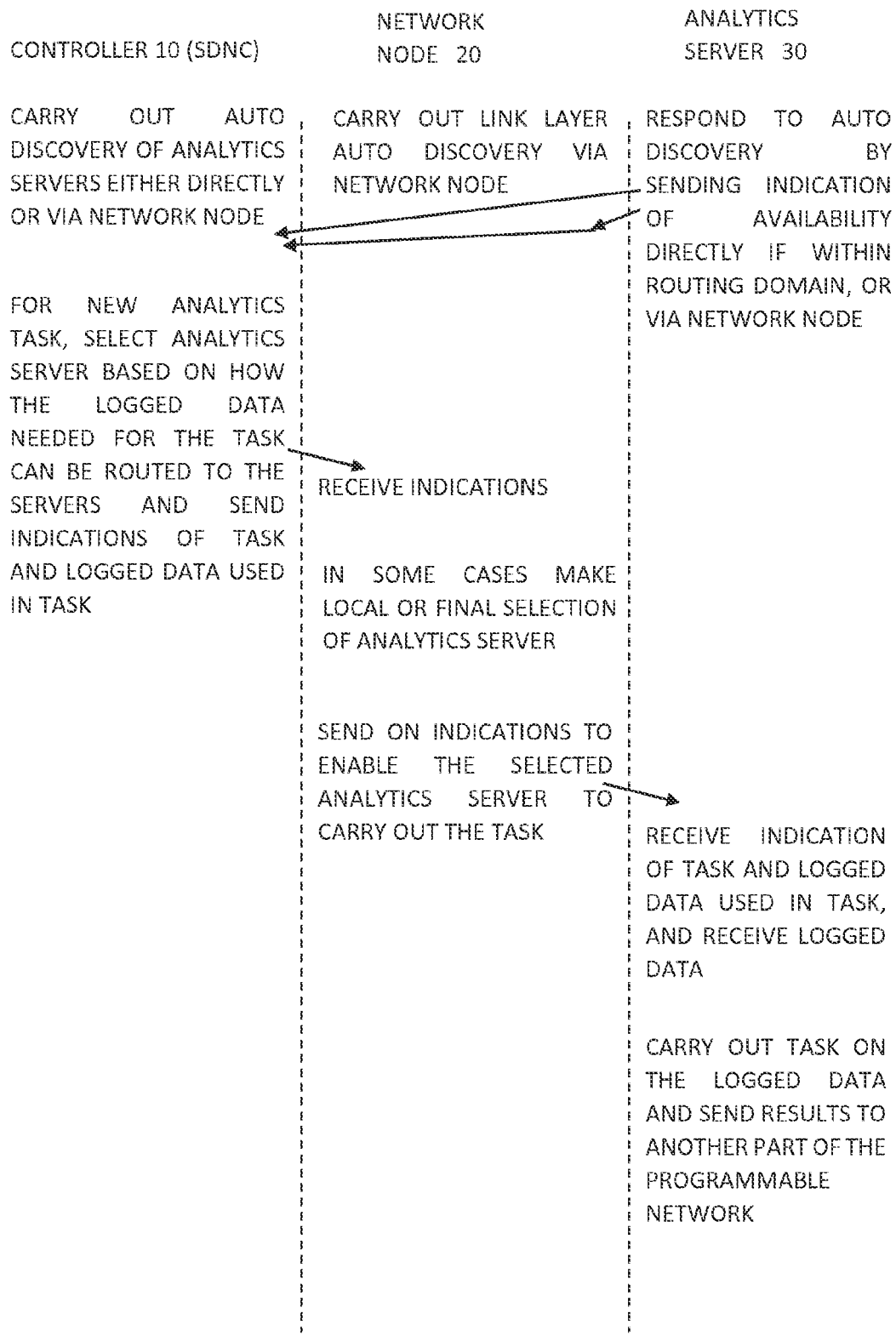
Figure 3:
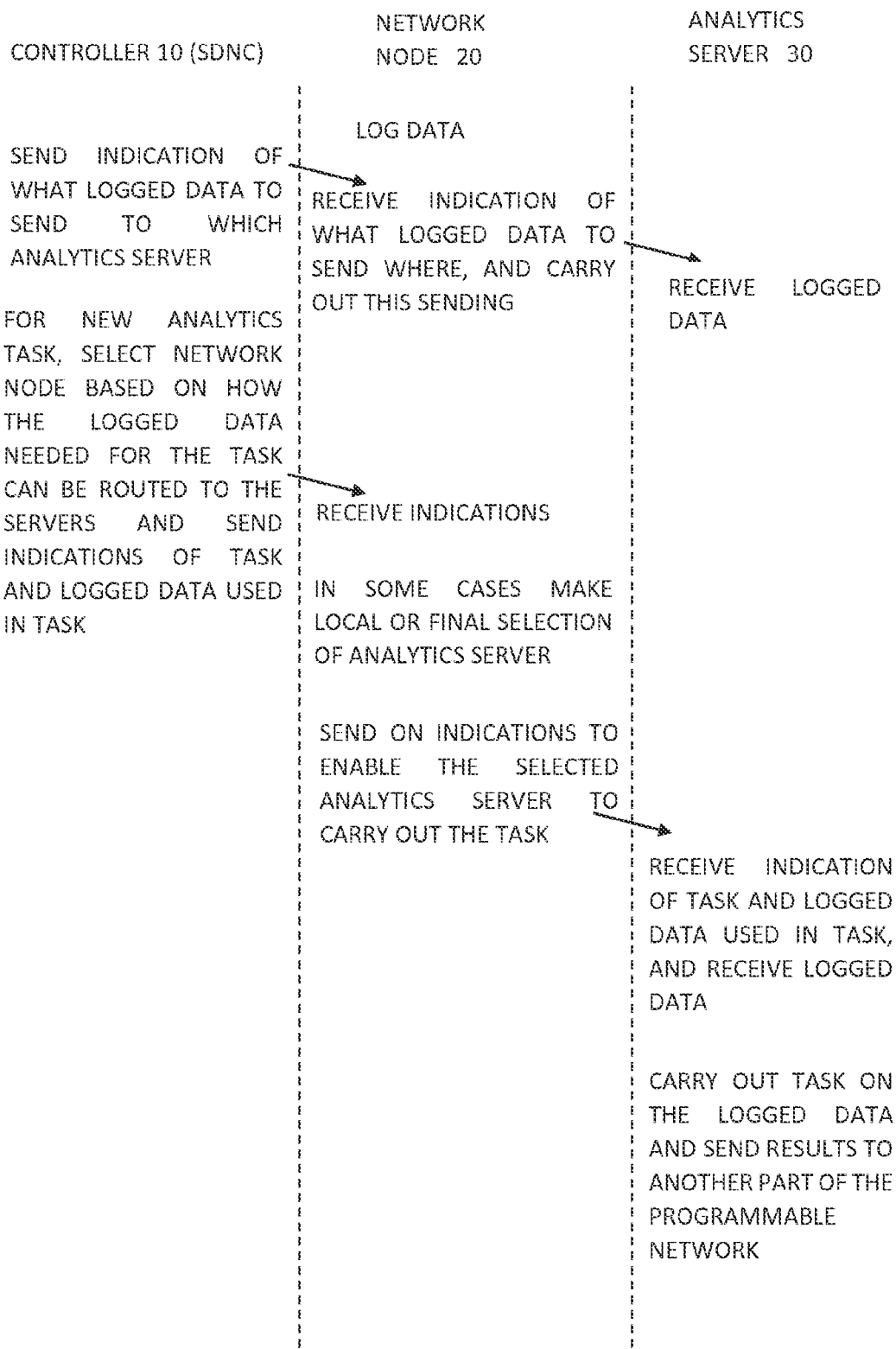
Figure 4:
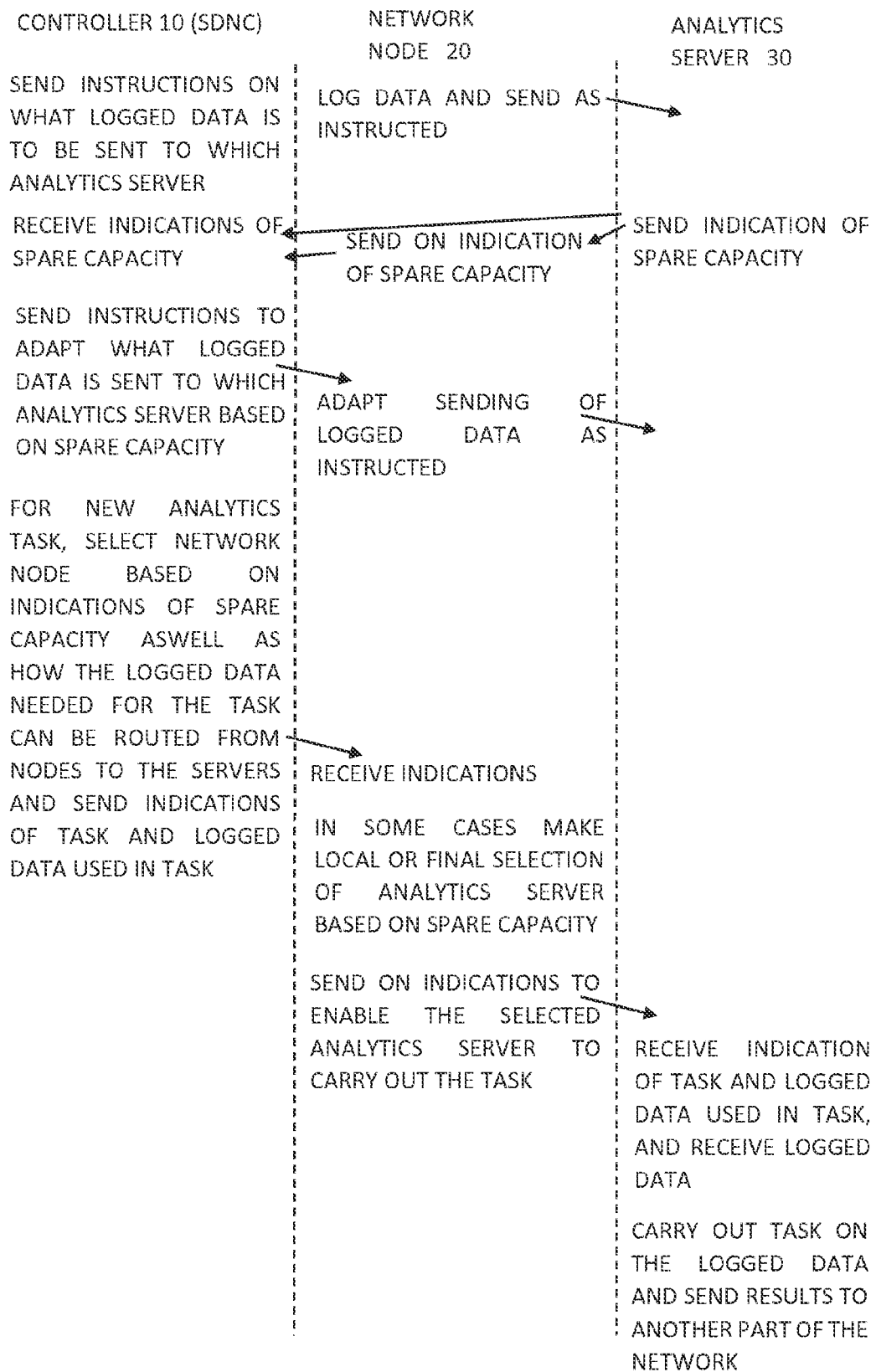

FIGS. 2 to 4, Embodiments Having Discovery.

FIG. 2 shows another sequence chart similar to that of FIG. 1. In this case, there is a preliminary step of carrying out an auto discovery of what analytics servers are available. This can be initiated either by the controller, or by a network node, or the analytics servers can advertise their presence and optionally send other characteristics. The analytics server can respond to an auto discovery initiated by the controller or network node. This can be easier to manage and scale up or down without needing to rely on manual input of what servers are available. It can also increase the resiliency of the network to faults or other changes affecting availability of the analytics servers.

This figure shows an example for the case that at least some of the analytics servers are within a routing domain of the controller and the auto discovery comprises receiving at the controller, indications from these analytics servers that they are available. This can have an advantage of more direct communication with the controller but more a cost of more complexity at the analytics server. The analytics server can respond to an auto discovery initiated by the controller or network node, by sending an indication of availability directly to the controller if within a routing domain of the controller. Otherwise it could rely on the network node to send an indication to the controller. In this case, where at least some of the analytics servers are not within a routing domain of the controller, the auto discovery comprises the controller receiving an indication from a network node that it has an associated analytics server available. This has an advantage of less complexity at the server but less direct communication with the controller. Further details of these two options of auto discovery are set out in relation to FIGS. 11 and 12 below.

FIG. 3, Embodiments Showing Managing Logged Data

FIG. 3 shows another sequence chart similar to that of FIG. 1. In this case, the controller is shown to sending to at least one of the network nodes, an indication of what data logged by that network node is to be sent to which of the analytics servers. This can help reduce an amount of data sent via the controller, compared to a different example in which the logged data is sent to the controller and then routed to the analytics server, (in which case the network node may not need to know which analytics server needs which logged data). Sending this indication can help avoid the need for the network node to send the logged data via the controller, which can lead to the processing or communication loads on the controller or DCN being reduced or spread more evenly in time or space, enabling the analytics tasks to be scaled up with less risk of temporary overload of the controller or DCN. In some cases the indication can be a default or generic indication suitable for an initial or general usage which can be adapted if needed, either by the controller or the analytics server. This may help avoid the need to send specific indications for every task and thus help reduce an overall number of indications and thus help simplify the operation.

The network node receives this indication of what logged data to send and to which of the analytics servers, and carries out this. Such indications may sent for each task, or default values may be sent for use when no specific instruction is sent for each task. This may help reduce the amount of instructions sent and thus help simplify the operation.

FIG. 4, Embodiments Indicating Amounts of Spare Capacity

FIG. 4 shows another sequence chart similar to that of FIG. 1. In this case, there is a step by the analytics server of sending an indication of amounts of spare capacity. This may be received and passed on by the network node. The controller receives these indication of amounts of spare capacity of the analytics servers. This can be a useful metric in managing the distribution of the tasks. Also shown is a step by the controller of sending to at least one of the network nodes an instruction to adapt what logged data is to be sent to which of the analytics servers, according to amounts of spare capacity of the analytics servers.

This can be a useful way of managing the distribution of the tasks more efficiently.

Also shown is the step by the controller of sending instructions to the network node of what logged data to send and where to send it in the sense of which analytics server to send it to. The network node receives the instruction, logs its data and sends it to one or more analytics servers as instructed. This sending may be adapted as shown. The controller may send an instruction to the network node to adapt its sending of logged data. This adapting may be on the basis of the amounts of spare capacity, indicated by the analytics servers, or other metrics. The network node is shown as adapting its sending of the logged data as instructed.

Also shown in this figure is the controller making its selection of which of the analytics servers to use based on current amounts of spare capacity of the analytics servers. This can help enable an even and efficient distribution of the tasks.

Figure 5:
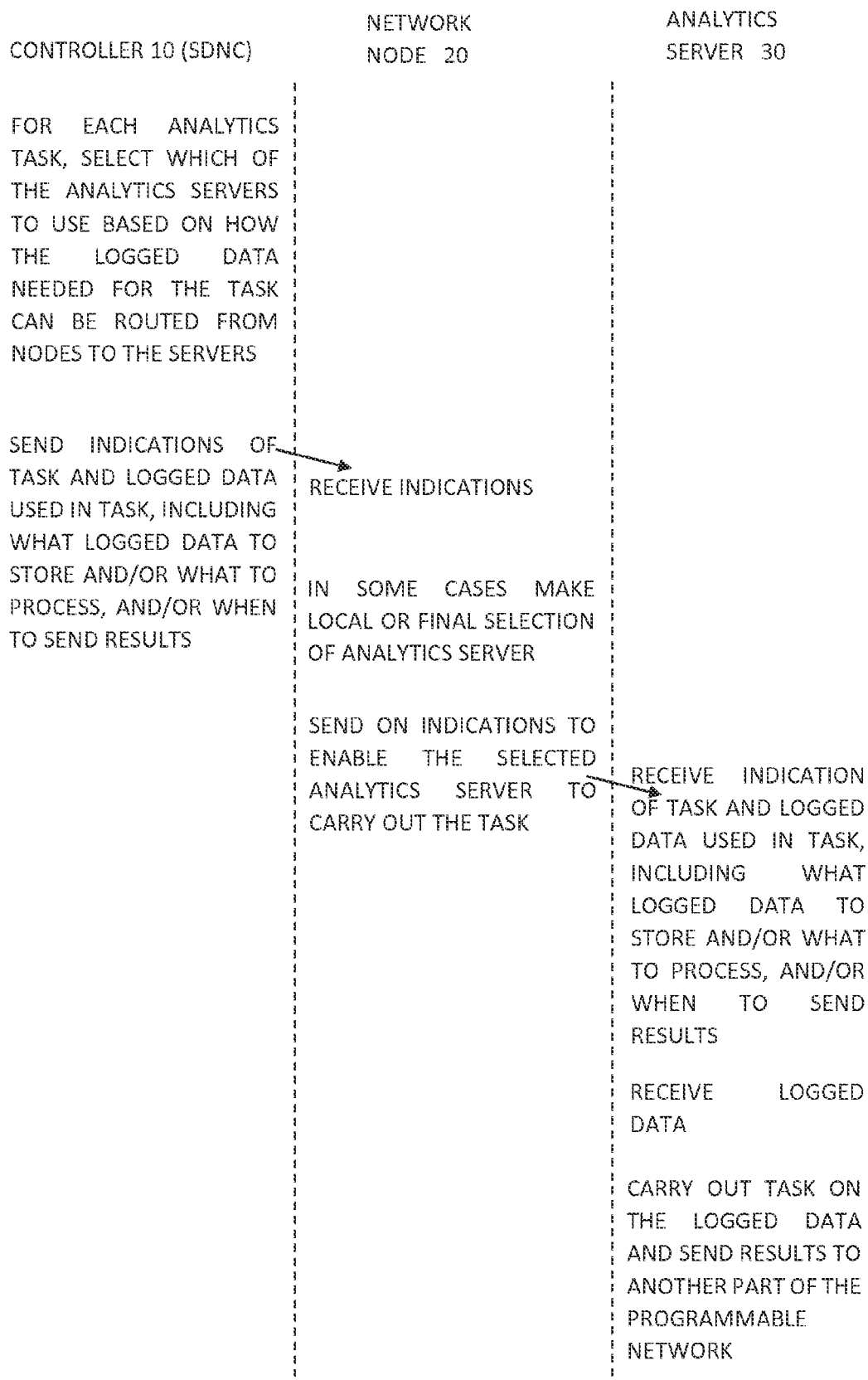

FIG. 5, Embodiments Having Indications with More Details of Logged Data

FIG. 5 shows another sequence chart similar to that of FIG. 1. In this case, there is shown a step by the controller of sending indications of the analytics task to the analytics server in the form of information about for example what received logged data to store, and/or what received logged data to process, and/or when to send the results. The analytics server receives this information and uses it in in carrying out the analytics task. This can be useful to enable the analytics task to be carried out efficiently and to enable the results to be passed to the controller efficiently.

Figure 6:
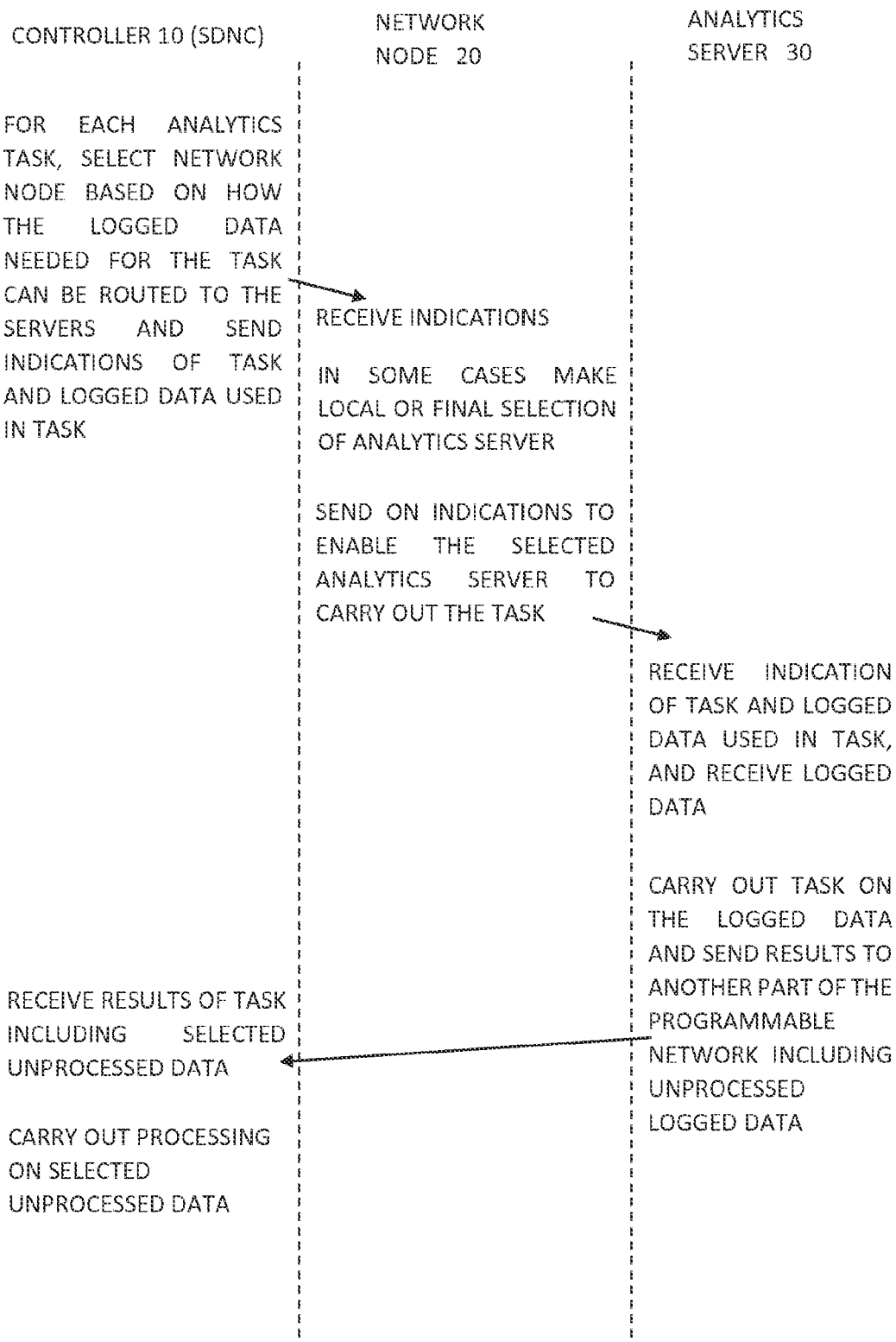

FIG. 6, Embodiments Having Unprocessed Logged Data

FIG. 6 shows another sequence chart similar to that of FIG. 1. In this case, there is shown an example in which the results of the analytics task comprises selected unprocessed logged data. These are sent to another part of the programmable network for further processing, for example by the controller, and at the controller there is shown the further step of carrying out processing of the unprocessed logged data. This can help make use of processing capacity at the controller if there is capacity, and if appropriate may make use of knowledge held at the controller about the network.

Figure 7:
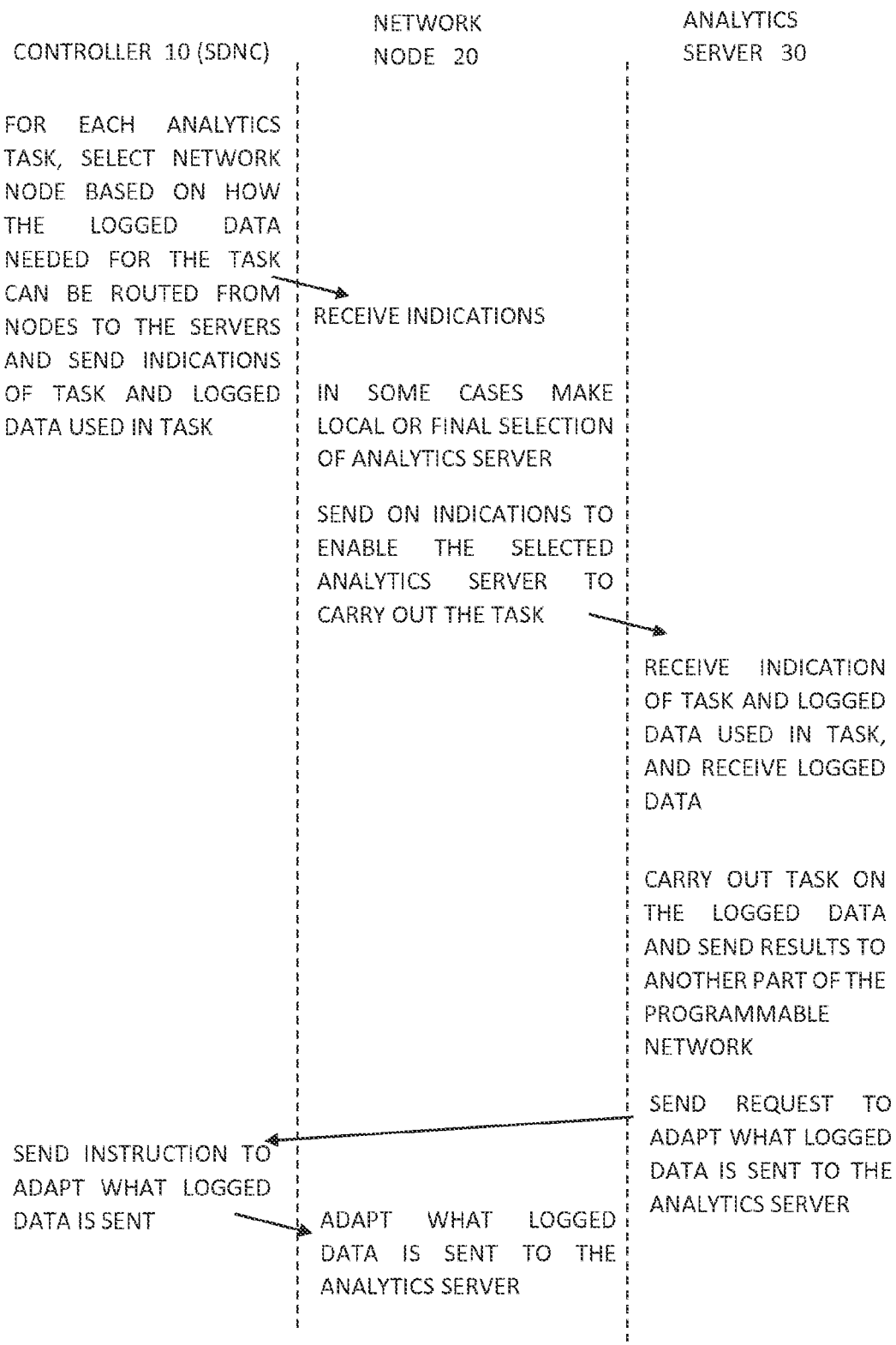

FIG. 7, Embodiments Having Request to Adapt What Logged Data is Sent

FIG. 7 shows another sequence chart similar to that of FIG. 1. In this case, after the analytics task has been started, there is shown a step by the analytics server of sending a request to adapt what logged data is sent to the analytics server. This request is shown as being received at the controller. The controller sends an instruction to the node or nodes to adapt what logged data is sent. The node receives this instruction and adapts what data is sent to the analytics server or servers. In some cases the controller could delegate this to the network node and arrange for the analytics server to communicate directly with the node, rather than going through the controller.

This feature can be beneficial in giving the analytics server some control over the data sent to it which enables adaptation to current conditions and thus help avoid overload or underuse of processing or communications resources. This can enable the rate of sending to be adapted, to match available capacity at the analytics server for example. Any other characteristic can be adapted, for example data compression, or data format, or routing of the data. If the logged data is not being received properly at the analytics server, this mechanism can be used to ask the controller to ask the node to retry, or to take other remedial action or ultimately, to try moving the task to another analytics server in case that helps.

Figure 8:
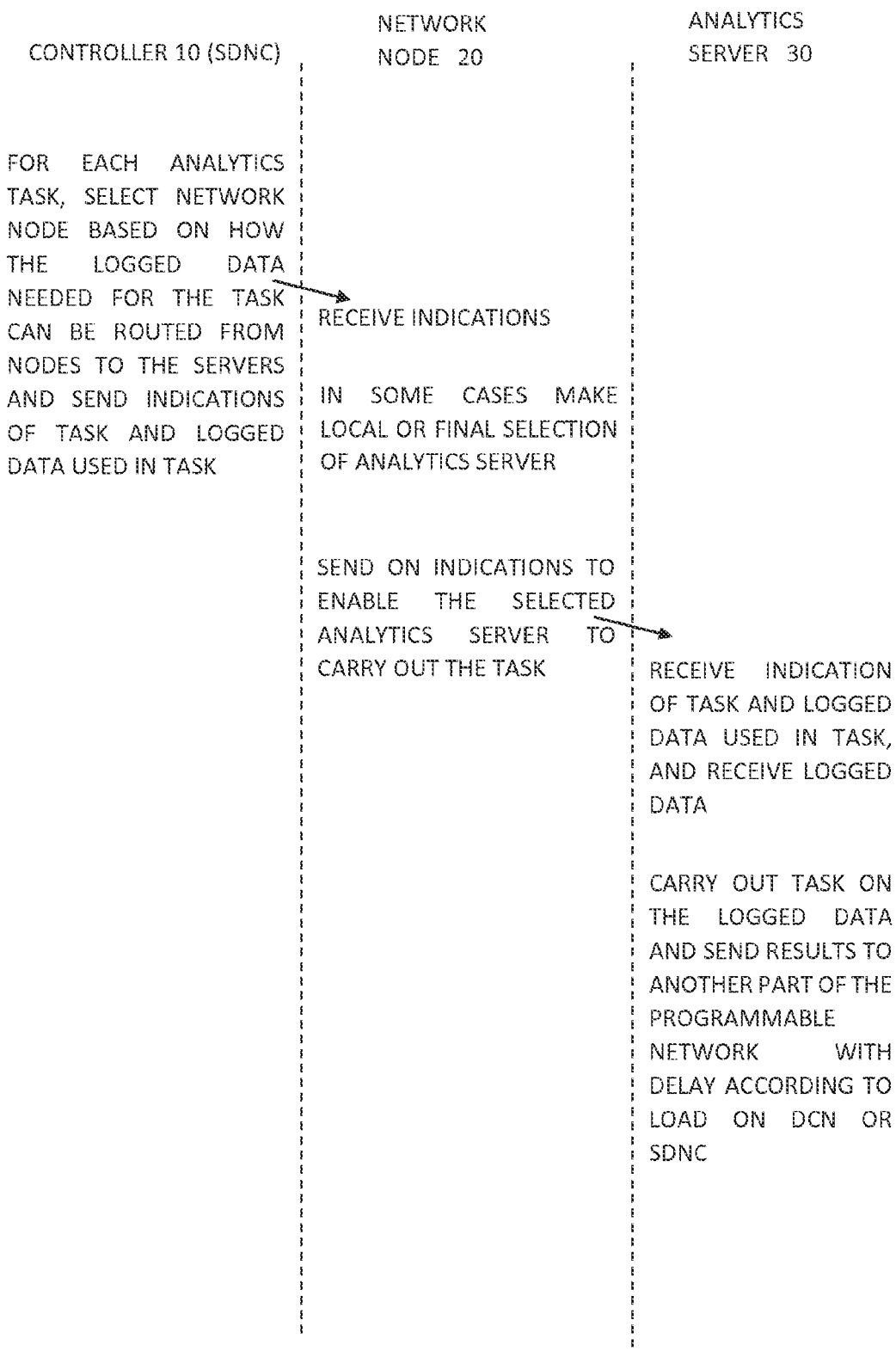

FIG. 8, Embodiments with Delay in Sending Results

FIG. 8 shows another sequence chart similar to that of FIG. 1. In this case, there is shown a step by the analytics server of delaying the sending of the results to the another part of the programmable network, according to a current load on at least the DCN and/or the controller. This can help enable adaptation to current conditions, and can thus help avoid overload of processing or communications resources.

Figure 9:
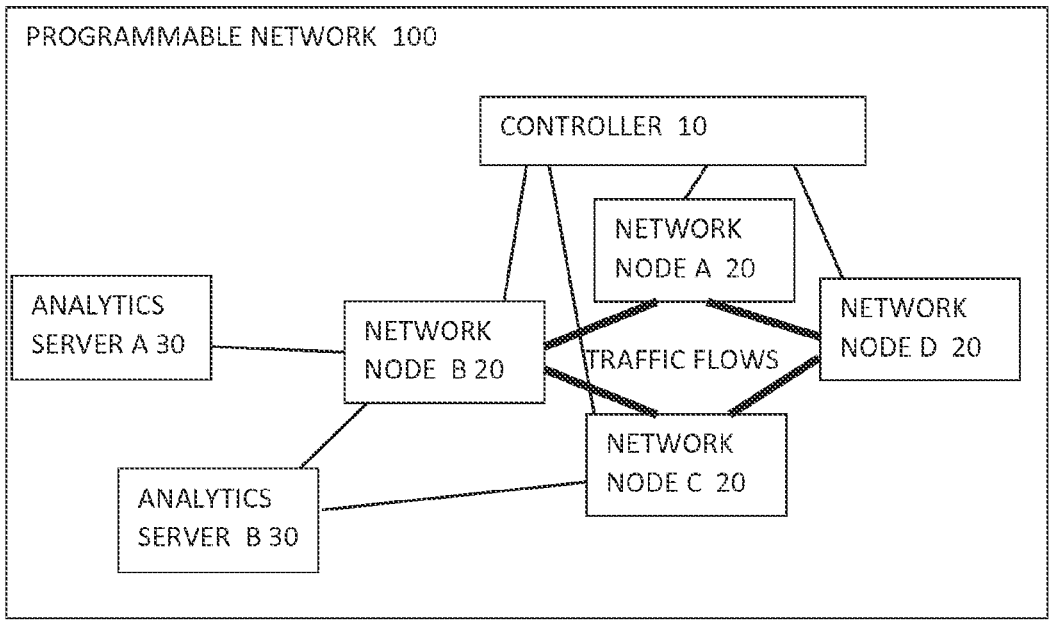
FIGS. 9 to 12 show schematic views of programmable networks having embodiments.
Figure 10:
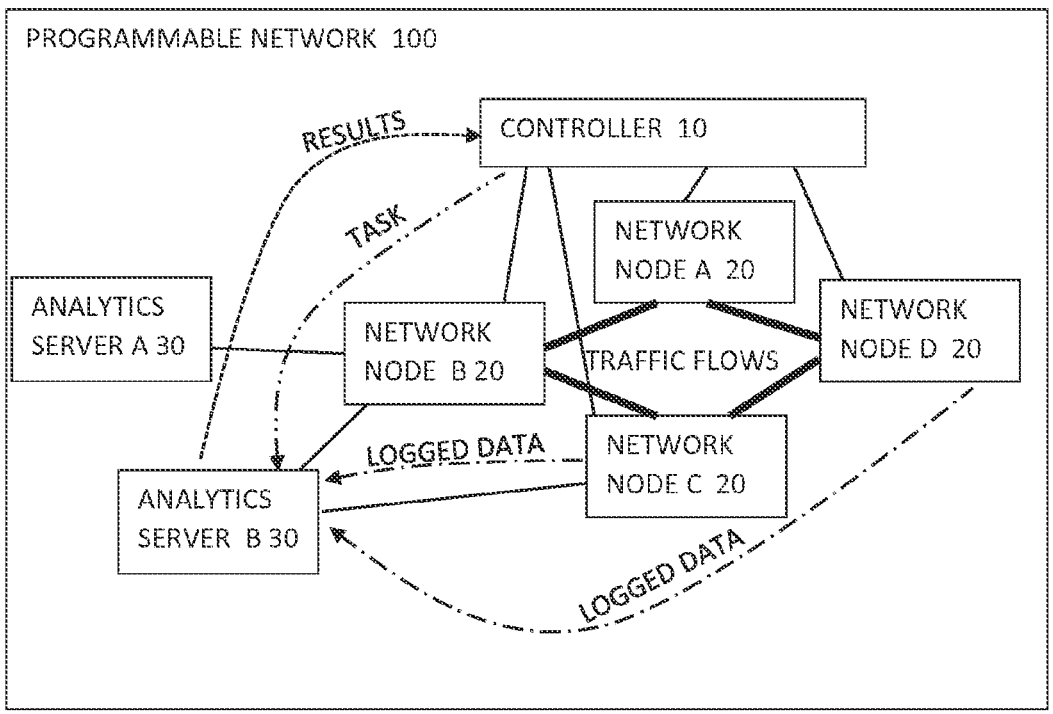

FIGS. 9, 10 Network Views

FIG. 9 shows a schematic view of entities in a programmable network according to embodiments. The programmable network 100 has a controller 10, coupled to network nodes 20, of which four are shown, (network node A, network node B, network node C, network node D) there may be many more in a typical network. Links are shown between the network nodes for carrying payload traffic flows, as well as DCN traffic for control or signaling or analytics tasks for example. An analytics server A 30 is shown, coupled to network node B. A second analytics server B 30 is shown coupled to network nodes B and C. The controller can be an example of a controller for carrying out the steps shown in FIGS. 1 to 8 for example. The network nodes can be examples of nodes for carrying out the steps shown in FIGS. 1 to 8 for example. The analytics servers can be examples of analytics servers for carrying out the steps shown in FIGS. 1 to 8 for example.

FIG. 10 shows a similar view to that of FIG. 9 and corresponding reference signs are used as appropriate. In addition are shown flows of communications over the DCN, involved in the methods of distributed managing of analytics tasks. So the controller sends an indication of a task, to an analytics server B, selected for that task. This can be sent via network node B as shown by the dot-dot-dash arrow, or by other route. The logged data can be sent from network nodes C and D to the analytics server, as shown by dot-dash arrows. Then the results can be sent from the analytics server B to the controller as shown by the dash arrow, via network node B, or conceivably by another route.

Figure 11:
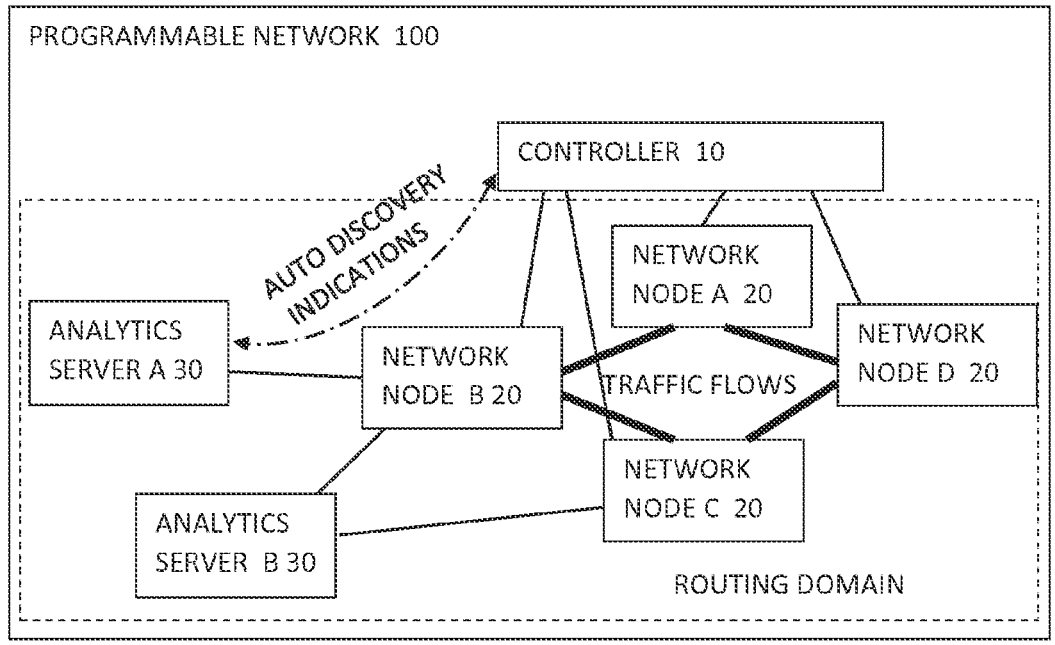
Figure 12:
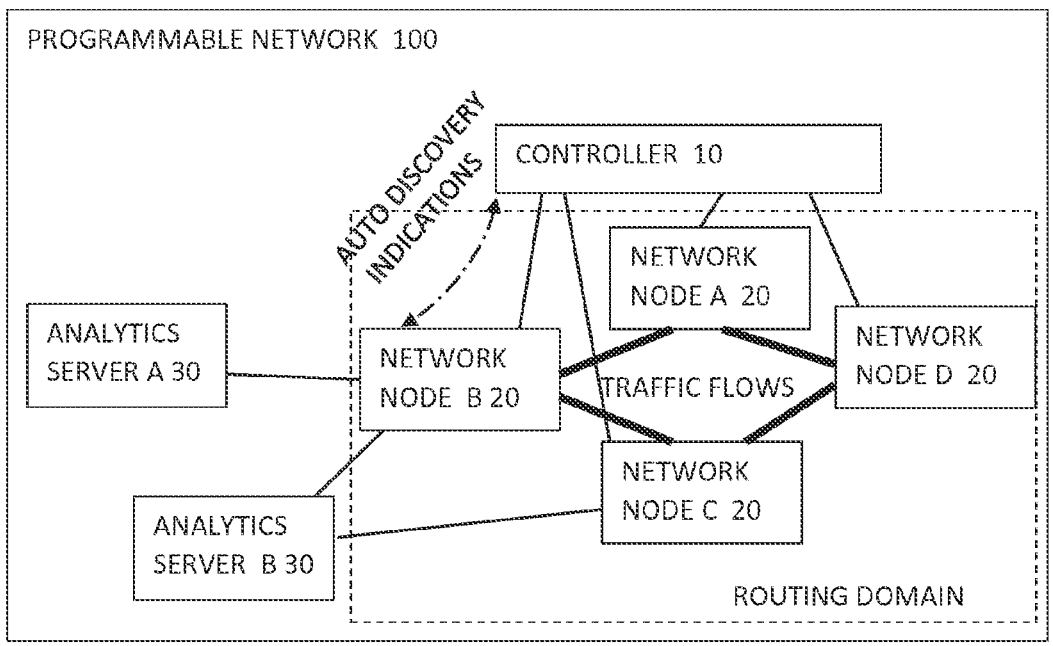

FIGS. 11, 12, Network Views with Different Routing Domains

FIG. 11 shows a similar view to that of FIG. 9 and corresponding reference signs are used as appropriate. In addition is shown an extent of a routing domain for the controller. In FIG. 11 this domain includes the analytics servers and in FIG. 12 the analytics servers are outside the domain, but coupled to network nodes within the domain. This has an effect on the communications over the DCN from the analytics servers, and in particular on the auto discovery process as will be explained in more detail below. Two different discovery methods will be described, which will be referred to as link layer discovery and routing. Both of them are equally feasible.

Routing Discovery Method:

The routing method foresees the extension of the routing domains to the analytics servers, which are capable of advertising their capabilities (i.e. not data nodes with switching or routing capabilities but analytics nodes with analytics storage and/or analytics processing capabilities). The nodes, accordingly to this proposed method, will be preconfigured to send analytics data to the closest (in terms of TE metrics) analytics server or the SDN controller will instruct them individually on which server to deliver data to depending on administrative or traffic engineering constraints.

Link Layer Discovery Method:

This method is useful in two cases at least:

1. When there is the willingness not to have a routing protocol running on the analytics server: in this case a simple lower layer discovery protocol is used between the analytics server and the node or nodes coupled to it (e.g. the analytics server B and network nodes C or D, or analytics server A and network node B). These nodes, referred to as the data forwarding nodes, can advertise in the routing instance the presence of an analytics server that they can reach with a given cost (TE metric).

2. When there is no routing protocol running in the network (e.g. a network which is run by a management protocol only like Netconf or by Open Flow). In this case the information regarding the presence and the capabilities of the analytics servers are gathered by the controller via these data forwarding nodes (i.e. nodes C or D for analytics server B). The analytics server can provide information on types of analytics it can perform, capability, and current load for example. This info is then used to instruct all the other nodes on how to deliver their analytics info.

FIGS. 13 to 18, Schematic Views of Embodiments.

Figure 13:
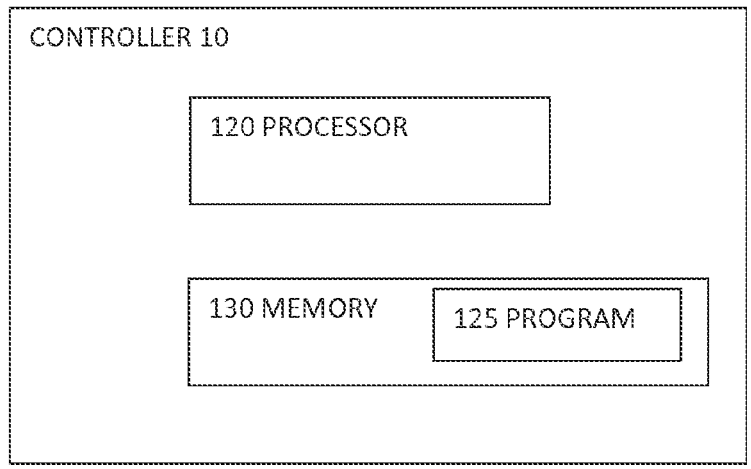
FIGS. 13 to 18 show apparatus according to embodiments.
Figure 14:
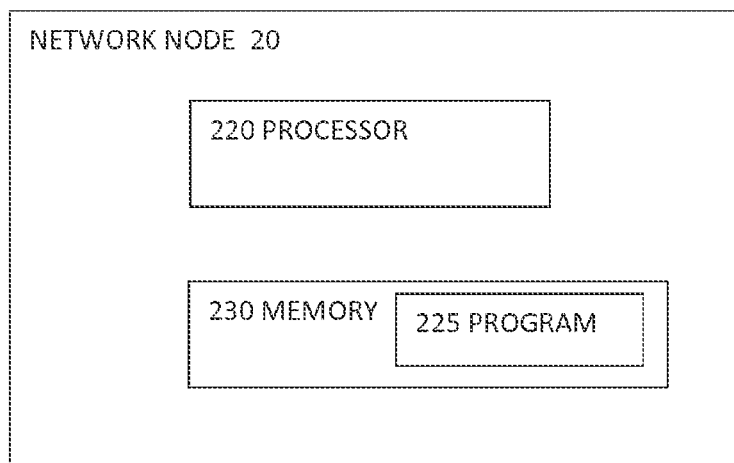
Figure 15:
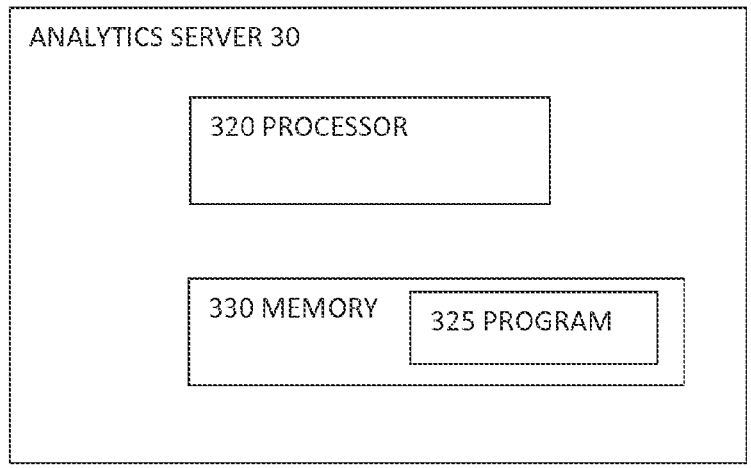

FIG. 13 shows a schematic view of a controller 10 for carrying out the operations shown in FIGS. 1 to 8 for example. The controller has a processor 120 and a memory 130 for storing a program 125 having instructions for causing the processor to carry out the methods. FIG. 14 shows a network node 20 for carrying out the operations shown in FIGS. 1 to 8 for example. The network node has a processor 220 and a memory 230 for storing a program 225 having instructions for causing the processor to carry out the methods. FIG. 15 shows an analytics server 30 for carrying out the operations shown in FIGS. 1 to 8 for example. The analytics server has a processor 320 and a memory 330 for storing a program 325 having instructions for causing the processor to carry out the methods.

Figure 16:
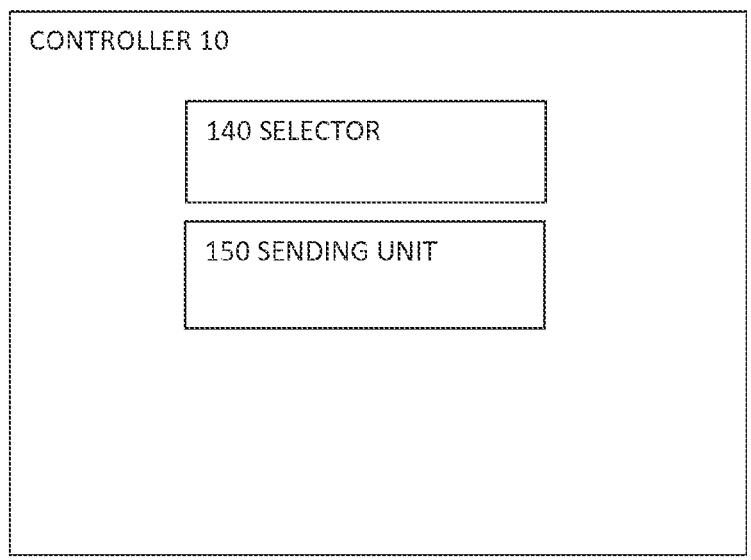
Figure 17:
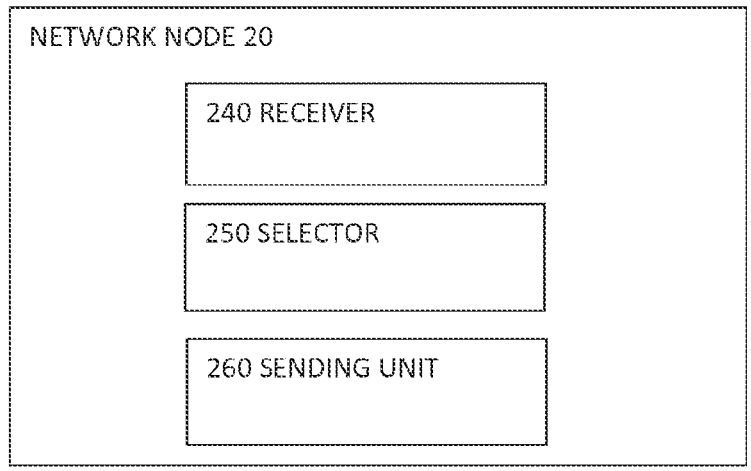

FIG. 16 shows a schematic view of a controller 10 for carrying out the operations shown in FIGS. 1 to 8 for example. The controller has a selector 140, for selecting which of the analytics servers to use for that analytics task based on how data logged by respective ones of the network nodes and needed for that analytics task, can be routed to the analytics servers, receiving from the selected analytics server over the DCN, results of carrying out the analytics task. The controller also has a sending unit 150, for sending to the selected analytics server, an indication of the analytics task and an indication of what data logged by the network nodes is to be used in the analytics task, to enable the selected analytics server to carry out the analytics task. In some cases the controller may also have a receiver for receiving from the selected analytics server over the DCN, results of carrying out the analytics task. FIG. 17 shows a network node 20 for carrying out the operations shown in FIGS. 1 to 8 for example. The network node has a receiver 240 for receiving from the controller an indication of the analytics task and an indication of what data logged by the network nodes is to be used in the analytics task. The node also has a selector 250 for selecting which of the analytics servers to use for that analytics task based on how the logged data needed for that analytics task can be routed to the analytics servers. The node also has a sending unit 260 for sending to the selected analytics server the indication of the analytics task, and the indication of what data logged by the network nodes is to be used, to enable the selected analytics server to carry out the analytics task.

Figure 18:
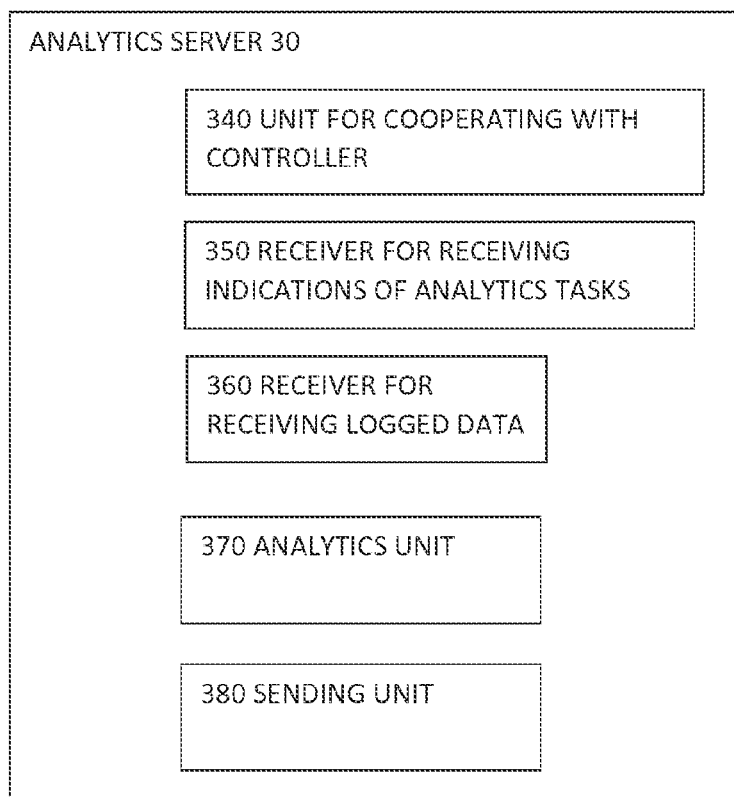

FIG. 18 shows an analytics server 30 for carrying out the operations shown in FIGS. 1 to 8 for example. The analytics server has a unit 340 for cooperating with the controller to enable the controller to select which analytics server to use for one of the analytics tasks on the basis of how data logged by the network nodes and needed for that analytics task can be routed to the analytics servers. The analytics server also has a receiver 350 for receiving indications of analytics tasks, and a receiver 360 for receiving the logged data. The analytics server also has an analytics unit 370, for carrying out the analytics task on that received logged data, and a sending unit 380 for sending to another part of the programmable network over the DCN, results of carrying out the analytics task.

Figure 19:
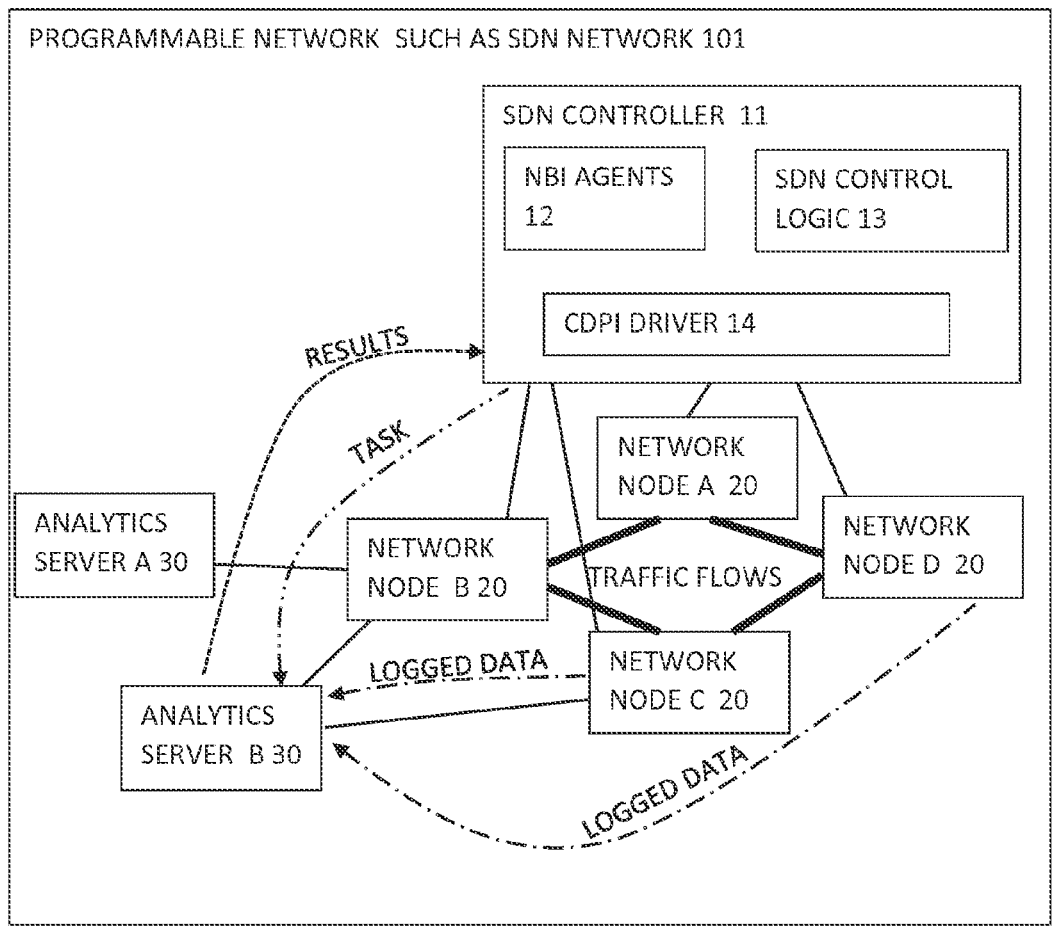
FIG. 19 shows a schematic view of an SDN network having embodiments.

FIG. 19, Schematic View of SDN Example

FIG. 19 shows a schematic view similar to that of FIG. 10, in which the programmable network is an SDN network 101 and the controller is an SDN controller 11. This SDN controller has, following established practice, NBI agents 12, for interfacing with applications, and a CDPI driver 14 for interfacing with the network nodes to control the network. An SDN control logic part 13 is provided for controlling the network following established SDN protocols. These parts can also carry out the operations of the controller for distributed management of analytics tasks as described above in relation to FIGS. 1 to 8 for example. Some ways of adapting the interface with the network nodes to enable these operations of the controller and network nodes will now be described in more detail.

Protocol Adaptation for Interface between SDN Controller and Network Nodes

Figure 20:
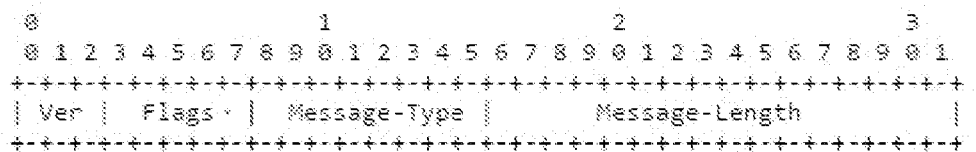
FIG. 20 shows a set of PCEP messages as defined in RFC 5440.

The interface in this example can contain the following information:
1. Data to be collected
2. Collection period
3. Sampling rate
4. Task to be performed
5. Destination of analytics server An example of protocol to be used in this case is the PCEP protocol (Path Computation Element Protocol). The PCEP protocol is based on messages and TLVs and is commonly used to tell the nodes which MPLS labels to push to the IP packets for correct forwarding (in MPLS based segment routing) or which nodes to use for the establishment of Traffic Engineered paths (used in MPLS networks with traffic engineering). The PCEP protocol could be extended in 2 ways: either adding a new message to the set of existing ones, or adding a TLV (Type Length Value) to an existing message. Since most of the messages are used for path computation and path setup, a relatively clean solution would be to add a message. RFC 5440 defines the set of PCEP messages as shown in FIG. 20.

A possible option is to define Message Type=8 (analytics server) and use it to carry the information indicated above. The interface between Network Nodes and Application Server can be arranged to support two different modes: batch processing mode and real-time processing mode. In the batch processing mode, the nodes send all collected logged data in a batch and send to the analytics server at once. In the real-time processing mode, a connection is open during the data collection period and the nodes stream the logged data to the analytics server in real-time.

Example Use Case of Transport SDN Management and Optimization Tool.

In this scenario, an analytics task is provided for analyzing traffic loads with a goal of enabling improved balancing of the traffic loads through all network nodes by redistributing traffic to avoid congestion and improve network QoS. The SDN controller firstly instructs the network node to do a traffic prediction and send the prediction results to an analytics server selected for this load balancing analytics task. Upon receiving the task, each node monitors its own traffic and predicts the upcoming traffic for the next period based on the historical data. The analytics server receives the traffic predictions from all the nodes and makes a decision how the traffic should be distributed and sends the result to the SDN controller. Based on the result from the analytics server, the SDN controller updates the flow table in the nodes to re-steer the traffic in the network. Many other types of analytics tasks can be envisaged.

Concluding Remarks

Examples have been described relating to distributed data processing of analytics tasks using analytics servers which may be dedicated or shared with other tasks. Examples have been described in which the analytics task distribution can be self-organized. Examples have been described with automated discovery of distributed analytics servers for processing and storage of logged data and results. Examples have been shown in which the transmission of the logged data and results relating to the analytics tasks can be routed to avoid bottlenecks and make optimal use of resources. These examples enable the analytics tasks to be managed efficiently and thus enable more scaling up to deal with large amounts of logged data and large number of nodes. Other variations can be envisaged within the claims.

The invention claimed is:

1. A method of distributed management of analytics tasks in a programmable network, the programmable network having a controller, a plurality of network nodes coupled to the controller by a Data Communications Network (DCN) configured to log data, and a plurality of analytics servers each coupled to at least one of the network nodes and configured to perform analytics tasks using logged data provided by the network nodes, the method comprising the controller, for each of the analytics tasks to be distributed:
selecting which of the analytics servers to use for that analytics task based on how data logged by respective ones of the network nodes and needed for that analytics task can be routed to the analytics servers; and
sending, to the selected analytics server, an indication of the analytics task and an indication of what data logged by the network nodes is to be used in the analytics task, to enable the selected analytics server to carry out the analytics task;
wherein selecting which of the analytics servers to use for that analytics task is based on a length of a path between the network node providing the logged data and the analytics server, the traffic load of the path between the network node providing the logged data and the analytics server, or both.

2. The method of claim 1, further comprising the controller receiving, from the selected analytics server over the DCN, results of carrying out the analytics task.

3. The method of claim 1, further comprising the controller carrying out an auto discovery of what analytics servers are available.

4. The method of claim 3, wherein:
   at least some of the analytics servers are within a routing domain of the controller; and
   the auto discovery comprises receiving indications from these analytics servers that they are available.

5. The method of claim 3, wherein:
   at least some of the analytics servers are not within a routing domain of the controller; and
   the auto discovery comprises receiving an indication from a network node that it has an associated analytics server available.

6. The method of claim 1, further comprising the controller sending, to at least one of the network nodes, an indication of what data logged by that network node is to be sent to which of the analytics servers.

7. The method of claim 1, further comprising the controller receiving an indication of amounts of spare capacity of the analytics servers.

8. The method of claim 7, further comprising the controller:
   sending, to at least one of the network nodes, an indication of what data logged by that network node is to be sent to which of the analytics servers;
   sending, to at least one of the network nodes, an instruction to adapt what logged data is to be sent to which of the analytics servers according to the indication of amounts of spare capacity of the analytics servers.

9. The method of claim 7, wherein the selecting is based on the indication of amounts of spare capacity of the analytics servers.

10. The method of claim 1, wherein the sending comprises sending information about any of: what received logged data to store, what received logged data to process, and/or when to send the results.

11. The method of claim 2,
    wherein the received results of the analytics task comprises selected unprocessed logged data; and
    further comprising the controller carrying out processing of the unprocessed logged data.

12. A method of distributed management of analytics tasks in a programmable network, the programmable network having a controller, a plurality of network nodes coupled to the controller by a Data Communications Network (DCN) configured to log data, and a plurality of analytics servers each coupled to at least one of the network nodes and configured to perform analytics tasks using logged data provided by the network nodes, the method comprising one of the network nodes, for each of the analytics tasks to be distributed:
    receiving, from the controller, an indication of the analytics task and an indication of what data logged by the network nodes is to be used in the analytics task;
    selecting which of the analytics servers to use for that analytics task based on how the logged data needed for that analytics task can be routed to the analytics servers; and
    sending, to the selected analytics server, the indication of the analytics task and the indication of what data logged by the network nodes is to be used, to enable the selected analytics server to carry out the analytics task;
    wherein selecting which of the analytics servers to use for that analytics task is based on a length of a path between the network node providing the logged data and the analytics server, the traffic load of the path between the network node providing the logged data and the analytics server, or both.

13. The method of claim 12, further comprising the one network node carrying out an auto discovery of the analytics servers coupled to the one network node.

14. The method of claim 13,
    wherein at least some of the analytics servers are not within a routing domain of the controller;
    wherein the auto discovery comprises sending an indication to the controller that the network node has an analytics server coupled to it and available.

15. The method of claim 12, further comprising the one network node:
    receiving, from the controller, an indication of what data logged by that network node is to be sent to which of the analytics servers; and
    sending the logged data according to that indication.

16. The method of claim 12, further comprising the one network node:
    receiving an indication of amounts of spare capacity of the analytics servers; and
    making the selection of which of the analytics servers to use according to the amounts of spare capacity.

17. The method of claim 16, further comprising the one network node:
    receiving, from the controller, an indication of what data logged by that network node is to be sent to which of the analytics servers;
    sending the logged data according to that indication; and
    adapting what logged data is to be sent by the network node to which of the analytics servers according to the indication of amounts of spare capacity of the analytics servers.

18. A method of distributed management of analytics tasks in a programmable network, the programmable network having a controller, a plurality of network nodes coupled to the controller by a Data Communications Network (DCN) configured to log data, and a plurality of analytics servers each coupled to at least one of the network nodes and configured to perform analytics tasks using logged data provided by the network nodes, the method comprising one of the analytics servers:
    cooperating with the controller to enable the controller to select which analytics server to use for one of the analytics tasks based on how data logged by the network nodes and needed for that analytics task can be routed to the analytics servers;
    receiving an indication of the analytics task and an indication of what data logged by the network nodes is to be used in the analytics task;
    receiving the indicated logged data from one or more of the network nodes;
    carrying out the analytics task on that received logged data; and
    sending results of carrying out the analytics task to another part of the programmable network over the DCN;
    wherein selecting which analytics server to use for that analytics task is based on a length of a path between the network node providing the logged data and the analytics server, the traffic load of the path between the network node providing the logged data and the analytics server, or both.

19. The method of claim 18, further comprising the one analytics server responding to an auto discovery of what analytics servers are available.

20. The method of claim 19,
    wherein the analytics server is within a routing domain of the controller; and wherein the responding comprises sending, to the controller, an indication that it is available.

21. The method of claim 19,
wherein the analytics server is not within a routing domain of the controller; and
wherein the responding comprises sending an indication of availability to a network node coupled to the analytics server for that network node to send to the controller.

22. The method of claim 18, further comprising the one analytics server sending, to the controller, an indication of an amount of spare capacity of the one analytics server.

23. The method of claim 18, further comprising the one analytics server sending, to the controller, a request to adapt what logged data is to be sent to the analytics server, after the analytics server has started carrying out that task.

24. The method of claim 18, wherein the receiving the indication of the analytics task comprises receiving information about any of: what received logged data to store, what received logged data to process, and/or when to send the results.

25. The method of claim 18, wherein the sending results comprises sending selected unprocessed logged data for further processing at the controller.

26. The method of claim 18, further comprising the one analytics server delaying the sending according to a load on at least one of: the DCN and the controller.

* * * * *